United States Patent
Eaton et al.

(10) Patent No.: US 9,538,333 B2
(45) Date of Patent: *Jan. 3, 2017

(54) SYSTEM AND METHOD FOR GATHERING INFORMATION ABOUT A SUBJECT IN CLOSE PROXIMITY TO A USER

(71) Applicant: B2 Equity Holdings, Inc., Naples, FL (US)

(72) Inventors: Bradley Alan Eaton, Oklahoma City, OK (US); David Pyron Biggers, Jr., Naples, FL (US); Dustin Paul Moore, Edmond, OK (US)

(73) Assignee: B2 Equity Holdings, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,262

(22) Filed: Aug. 18, 2016

(65) Prior Publication Data

US 2016/0360365 A1    Dec. 8, 2016

Related U.S. Application Data

(60) Continuation of application No. 14/818,759, filed on Aug. 5, 2015, now Pat. No. 9,426,623, which is a division of application No. 14/532,877, filed on Nov. 4, 2014, now Pat. No. 9,137,640.

(60) Provisional application No. 61/901,274, filed on Nov. 7, 2013.

(51) Int. Cl.
| | |
|---|---|
| *H04W 24/00* | (2009.01) |
| *H04W 4/02* | (2009.01) |
| *H04W 4/00* | (2009.01) |
| *H04W 8/18* | (2009.01) |
| *H04W 64/00* | (2009.01) |
| *H04L 29/08* | (2006.01) |

(52) U.S. Cl.
CPC ............. *H04W 4/023* (2013.01); *H04W 4/001* (2013.01); *H04W 4/008* (2013.01); *H04W 8/183* (2013.01); *H04W 64/00* (2013.01); *H04L 67/24* (2013.01)

(58) Field of Classification Search
CPC ........ H04W 4/02; H04W 64/00; H04W 4/023; H04W 4/025; H04W 4/021; H04W 40/20; H04W 4/00; H04W 4/008; H04W 4/04; H04W 4/043; H04W 16/20; H04L 67/24; G06Q 30/02; G01C 15/00; G01S 15/06; G01S 15/08; G01S 17/06; G01S 19/13; G01B 11/14; G01B 11/28; G01B 7/14
USPC ... 455/456.3, 456.1, 456.2, 404.2, 418, 457, 455/41.2, 420, 67.11; 370/252, 338
See application file for complete search history.

(56) References Cited

U.S. PATENT DOCUMENTS

| | | |
|---|---|---|
| 9,137,640 B2 | 9/2015 | Eaton et al. |
| 9,426,623 B2 | 8/2016 | Eaton et al. |
| 2005/0138178 A1 | 6/2005 | Astarabadi |
| 2006/0135183 A1 | 6/2006 | Zavada et al. |

(Continued)

OTHER PUBLICATIONS

"Apple iBeacons come to real estate listings", http://www.inman.com/2014/09/ 15/apple-ibeacons-come-to-real-estate-listings/: Sep. 15, 2014, 2 pages.

(Continued)

*Primary Examiner* — Fred Casca
(74) *Attorney, Agent, or Firm* — Thompson Coburn LLP

(57) ABSTRACT

Techniques where a computer system is able to obtain information about a subject by communicating with a device that employs a limited range communication technology and is associated with the subject are described.

20 Claims, 13 Drawing Sheets

(56) References Cited

U.S. PATENT DOCUMENTS

| | | | |
|---|---|---|---|
| 2006/0247849 A1 | 11/2006 | Mohsini et al. |
| 2007/0244633 A1 | 10/2007 | Phillips et al. |
| 2008/0059562 A1 | 3/2008 | Jones |
| 2009/0067392 A1 | 3/2009 | Hart et al. |
| 2011/0074547 A1 | 3/2011 | Seshadri |
| 2013/0182891 A1 | 7/2013 | Ling |
| 2013/0210461 A1 | 8/2013 | Moldavsky et al. |
| 2014/0185518 A1 | 7/2014 | Ramakrishnan et al. |
| 2014/0258165 A1 | 9/2014 | Heil |

OTHER PUBLICATIONS

"Estimote Beacons. Real world context for your apps.", http://web.archive.org/web/20131105113915/http://estimote.com/ for Nov. 5, 2013, downloaded on Feb. 16, 2015, 6 pages.

"QR Codes for Real Estate", http://web.archive.org/web/20131008201925/http://www.gohomes.com/ for Oct. 8, 2013, downloaded Feb. 16, 2015, 1 page.

"Real estate enters the age of 'micro-location' marketing", http://www.inman.com/2014/06/11/real-estate-enters-the-age-of-micro-location-marketing/; Jun. 11, 2014, 4 pages.

"Realty Beacon—iBeacons for Real Estate", http://web.archive.org/web/20141218060312/http://realtybeacon.com/ for Dec. 18, 2014, downloaded Feb. 16, 2015, 3 pages.

"realtybeacon.com review", http://newindex.fr/realtybeacon.com, showing "last updated on Aug. 11, 2014", downloaded Feb. 10, 2015, 5 pages.

International Search Report and Written Opinion for PCT/US2014/063902 dated Jan. 30, 2015.

Strobel, Wayne, "Breakthrough Consumer Experiences", http://www.inman.com/speakers/wayne-strobel/, 2 pages.

Prosecution History for U.S. Appl. No. 14/532,877, now U.S. Pat No. 9,137,640, filed Nov. 4, 2014.

Prosecution History for U.S. Appl. No. 14/818,759, now U.S. Pat No. 9,426,623, filed Aug. 5, 2015.

SYSTEM AND METHOD FOR GATHERING INFORMATION ABOUT A SUBJECT IN CLOSE PROXIMITY TO A USER

CROSS-REFERENCE AND PRIORITY CLAIMS TO RELATED PATENT APPLICATIONS

This patent application is a continuation of U.S. patent application Ser. No. 14/818,759, filed Aug. 5, 2015, and entitled "System and Method for Gathering Information about a Subject in Close Proximity to a User", now U.S. Pat. No. 9,426,623, which is a divisional of U.S. patent application Ser. No. 14/532,877, filed Nov. 4, 2014, and entitled "System and Method for Gathering Information about a Subject in Close Proximity to a User", now U.S. Pat. No. 9,137,640, which claims priority to U.S. provisional patent application Ser. No. 61/901,274, filed Nov. 7, 2013, the entire disclosures of each of which are incorporated herein by reference.

This patent application is related to PCT patent application PCT/US14/63902, filed Nov. 4, 2014, the entire disclosure of which is incorporated herein by reference.

INTRODUCTION

People often desire to obtain information about people, places, or things nearby, whether it be a building, landmark, business, natural formation, or any other physical location; a celebrity, business professional, or a private individual; or an item for sale, a work of art on display at a museum, or machinery in use (e.g. machinery at a natural gas well). The above described locations, people, or objects may herein be referred to as "subjects." Information about a subject is intrinsically more useful when learned, and a user can immediately act upon the information while in close proximity to the subject. Learning things about a subject gives people important information about their surroundings.

Conventional methods of obtaining information about a subject include using printed materials about the subject, communicating with people who have knowledge about the subject, using Internet-based search engines to access electronic databases containing information about the subject, or physically inspecting the subject to retrieve information being displayed on some physical gauge, sensor, or data terminal screen.

Conventional methods of obtaining information about the subject may be slow, cumbersome, or error prone. If the subject is a structure, such as a house, building, or business for sale, there may not be any information pertaining to the subject at its location. Or, there may not be a person with knowledge about the subject available to relay the information. If the subject is a person, that person may currently be talking to other people or difficult to directly engage in conversation. If the subject is an object, physical information about the object may have been taken or destroyed, the object may be hazardous, or difficult to approach. Even in cases where information can be obtained about the subject from a conventional method, some information is intrinsically less useful if it is not obtained in close proximity to the subject. Also, if information is obtained from different sources, organizing and keeping track of the information may be difficult and cumbersome.

With the wide-spread adoption of mobile communication devices that include a GPS unit, many systems have emerged for providing information about structures, buildings, landmarks, businesses, and other subjects by relating the geographic position of the mobile device to the subject in question. For example, U.S. Pat. No. 7,072,664 describes a method for obtaining information using a position-aware device that communicates via a network to a database with information indexed based on geographic positions. The inherent problem with this approach is that there is often not a direct correlation between a geographic position as registered by a device and a particular subject for which information is desired. In cases where there are multiple subjects in close proximity to the same geographic location, the user will often be forced to manually choose which subject about which they want information. In cases where there is no Internet connection available, this method also fails. In addition, the accuracy of GPS technology can be affected by environmental conditions and/or obstructions such as trees and buildings. Under some circumstances, the technology will not work at all.

The present invention relates to a method and apparatus for exchanging and managing information about a subject, which happens to be in close proximity to the apparatus, and more particularly, to a wireless device that uses limited range communication technology to manage and exchange such information.

In an effort to address the aforementioned problems, the exemplary embodiments of the present invention provide an apparatus and method, whereby a computer system is able to obtain information about a subject by communicating with a device that employs a limited range communication technology and is associated with the subject. Moreover, techniques are described herein for resolving between the different limited range signals transmitted by different limited range wireless transmitters so that several limited range wireless transmitters can be used in proximity with each other, such as within a real estate property (e.g., a home or apartment).

Other objects, advantages, and features associated with the embodiments described herein will become apparent to those skilled in the art from the following detailed description. In addition, several details are capable of modification in various aspects, all without departing from the invention. Accordingly, the drawings and descriptions herein are to be regarded as illustrative in nature, and not limiting.

DETAILED DESCRIPTION

Figure 1:
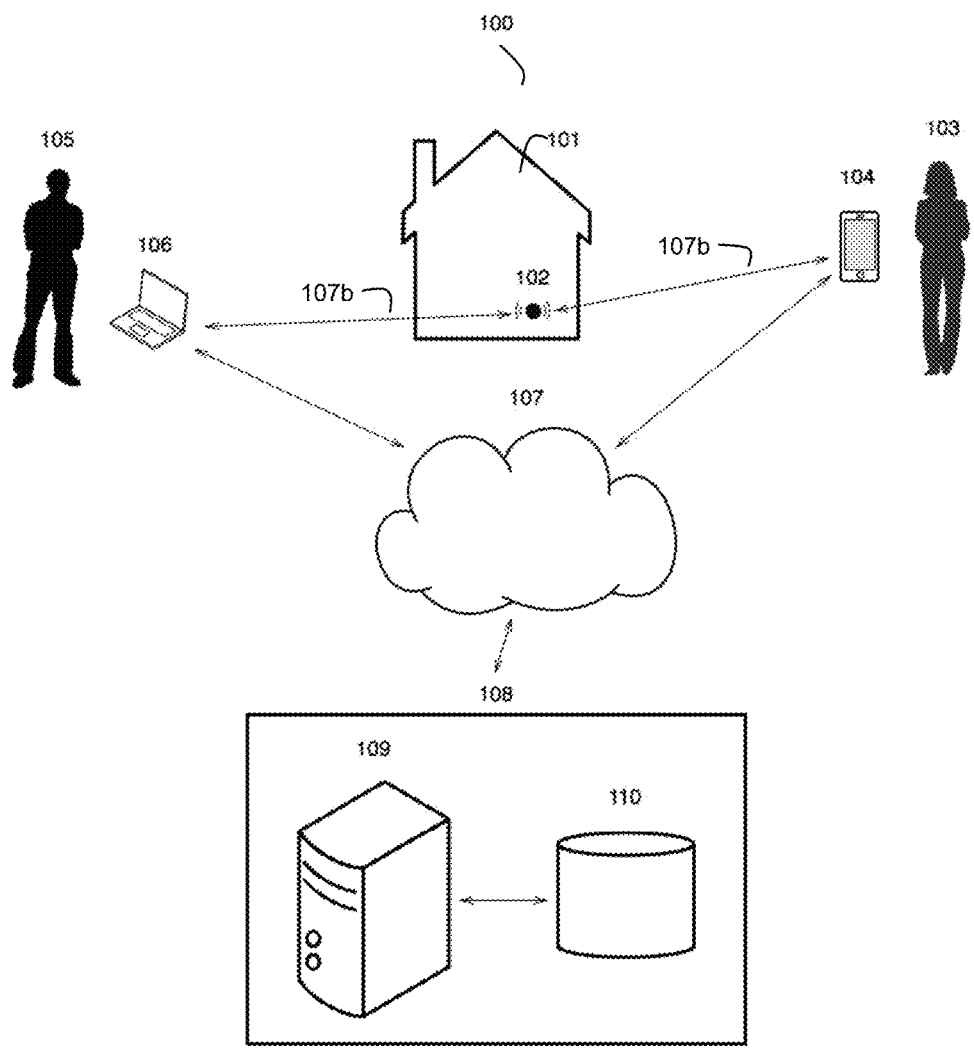
FIG. 1 illustrates an information exchange system according to an exemplary embodiment.

FIG. 1 illustrates an embodiment of an information retrieval system 100. The system 100 includes one or more subjects (person, place or thing) 101. One or more limited range transceivers (LRTs) 102 provide information about the subject 101 to one or more users 103, 105 using one or more wireless computing devices 104, 106 equipped with corresponding LRTs. The system 100 may further include an information system 108 that includes a server 109 and database 110. The subject's 101 LRT 102 may send out an identifier to the mobile devices 104, 106 via limited range wireless data communication 107*b*. Users 103, 105 may retrieve proximity-based, context-centric information from the LRT 102 or the information system 108 when the wireless computing devices 104, 106 send the received identifier over the network 107 to the information system 108. The server 109 may use the identifier to reference data stored in the database 110 about the subject 101.

Figure 4:
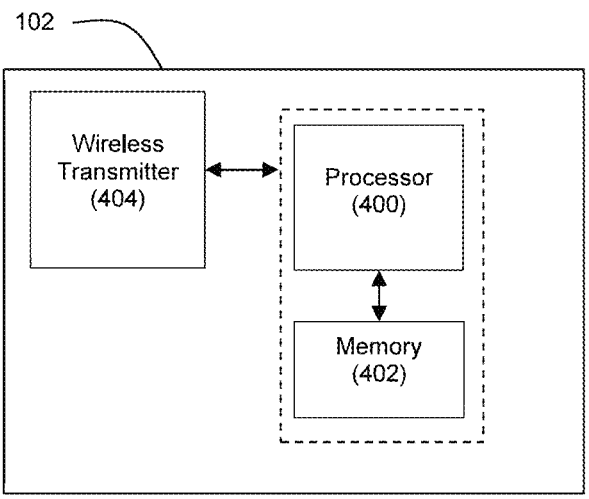
FIG. 4 illustrates an system diagram for a limited range transmitter.

An exemplary configuration for the LRT 102 is illustrated in FIG. 4. As shown in FIG. 4, the LRT 102 at least includes a processor 400, a memory unit 402 and a wireless transmitter 404. The memory 402 may store instructions and protocols for transmitting data according to an LRT technology. For example, the memory 402 may store the Bluetooth protocol so that data can be transmitted to other devices according to Bluetooth standards. The processor 400 may execute the instructions saved in the memory 402. The processor 400 may prepare data to be sent according to any LRT technology. Also, the processor 400 may send commands to the wireless transmitter 404 so that the wireless transmitter 404 transmits data wirelessly. The wireless transmitter 404 may include an antenna or any other wireless transmitting device.

As used herein, the term "limited range" means any wireless technology that communicates data only over relatively short distances. For example, the range of the LRT 102 may be less than 10,000 feet. However, depending upon the desires of a practitioner, shorter ranges may be employed, such as a range between 100-200 feet (e.g., around 150 feet). The range of the LRT 102 may be calibrated based on the amount of power provided to the LRT 102 or other factors that may affect range.

In one embodiment, a first wireless device 104 is a hand-held, electronic device including Bluetooth 4.0 low energy technology. The LRT 102 may use the same Bluetooth 4.0 low energy technology. In another embodiment, the first mobile device 104 and the LRT 102 may communicate using 802.11-based WiFi technology. In yet another embodiment, the first mobile device 104 and the LRT 102 may communicate using line-of-sight infrared communication technology. In various embodiments, the first and second devices 104 and 106 may be any portable electronic device comprising LRT technology. For example, the first and second mobile devices 104, 106 may include, but are not limited to, smart phones, tablet computers, laptop computers, electronic book readers, smart watches, portable workstations, and personal data assistants (PDA's). The mobile device 104, 106 may implement web-based technology, such as HTML/CSS, JavaScript, or other web technologies. The mobile devices 104, 106 may be any portable electronic device configured to (1) present data about the subject 101 to a user through a user interface (e.g. graphical screen, speaker, vibration unit, digital text display, gauge, light or indicator) and (2) communicate with the LRT 102. The first and second mobile devices 104, 106 may also include a user input device, such as a touch screen or keyboard.

Each mobile device 104, 106 may be configured to run software that retrieves and displays context-centric information about the subject 101 after the mobile device 104, 106 receives information from the information system 108 or the LRT 102. A user interface rendered on the first and second mobile devices 104, 106 may include other features, including, for example, information retrieval, appointment scheduling, data searches, posts to social media portals, etc.

Figure 5:
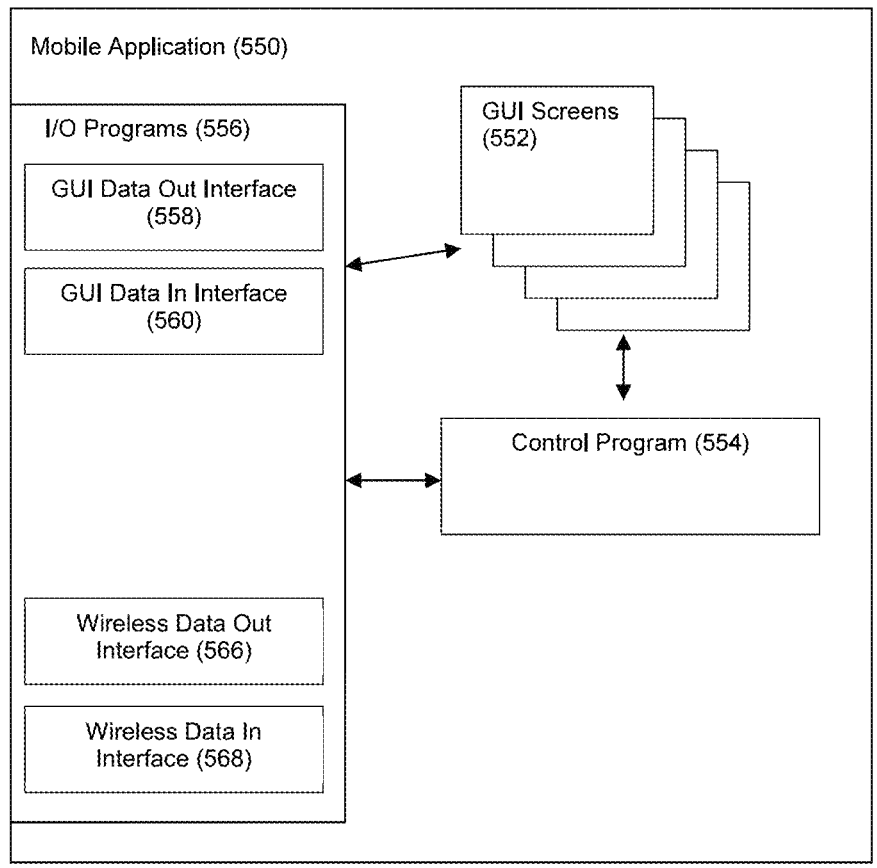
FIG. 5 illustrates an exemplary architecture for a mobile application executed by a mobile device.

FIG. 5 depicts an exemplary mobile application 550 for an exemplary embodiment. Mobile application 550 may be installed on the mobile device 140, 106 for execution by the mobile device's processor. The mobile application 550 preferably comprises a plurality of computer-executable instructions resident on a non-transitory computer-readable storage medium such as a computer memory. The instructions may include instructions defining a plurality of GUI screens for presentation to the user through a I/O device. The instructions may also include instructions defining various I/O programs 556 such as:

- a GUI data out interface 558 for interfacing with the I/O device to present one or more GUI screens 552 to the user;
- a GUI data in interface 560 for interfacing with the I/O device to receive user input data therefrom;
- a wireless data out interface 566 for interfacing with wireless I/O to provide the wireless I/O with data for communication over the network 107; and
- a wireless data in interface 568 for interfacing with the wireless I/O to receive data communicated over the network 107 to the portable computing device for processing by the mobile application 550.

The instructions may further include instructions defining a control program 554. The control program may be configured to provide the primary intelligence for the mobile application 550, including orchestrating the data outgoing to and incoming from the I/O programs 556 (e.g., determining which GUI screens 552 are to be presented to the user).

The subject 101 may be a place, person, or object including but not limited to (1) a physical structure, such as a residence, apartment, apartment building, detached home, partially detached home, townhouse, condominium, co-op, or an individual room within any physical structure; (2) a natural feature such as a body of water, glacier, canyon, cave, mountain range, etc.; (3) a historical feature such as a monument, memorial, museum, cathedral, tourist attraction, statue, battle field, historic location, park, trail, etc.; (4) a physical object such as an individual car at a dealership, a work of art at a museum, a piece of machinery in production at a gas well, etc.; or (5) a celebrity at an awards event, a professional athlete at a game, race or competition, or a business person attending a trade show or professional organization event. In each case, information is provided about the subject 101, and users 103, 105 may obtain information about the subject 101 according to the exemplary embodiments described herein.

The network 107 may be any interconnecting network, including an intranet, a local area network, a wide area network, or an extranet, such as the Internet. The network 107 can be physically implemented on a wireless or wired network, on leased or dedicated lines, including a virtual private network (VPN). The network 107 can be any type of communications network that communicatively connects the mobile devices 104, 106 and the information system 108.

The information system 108 may be any platform or technology that allows the storage and retrieval of information pertaining to subjects 101. The information may be text, an image, a floor-plan, a CAD drawing, a multi-media video, financial information, an audio clip, or any other type of data. The information system 108 may include a variety of different information indexed by the identifiers provided by LRT 102. The information system 108 may also be an aggregator of data, wherein it has knowledge of the identifiers provided by the LRT 102, but the information system 108 retrieves all information regarding the subject 101 from other information systems not configured specifically for operation as part of system 100.

Figure 2A:
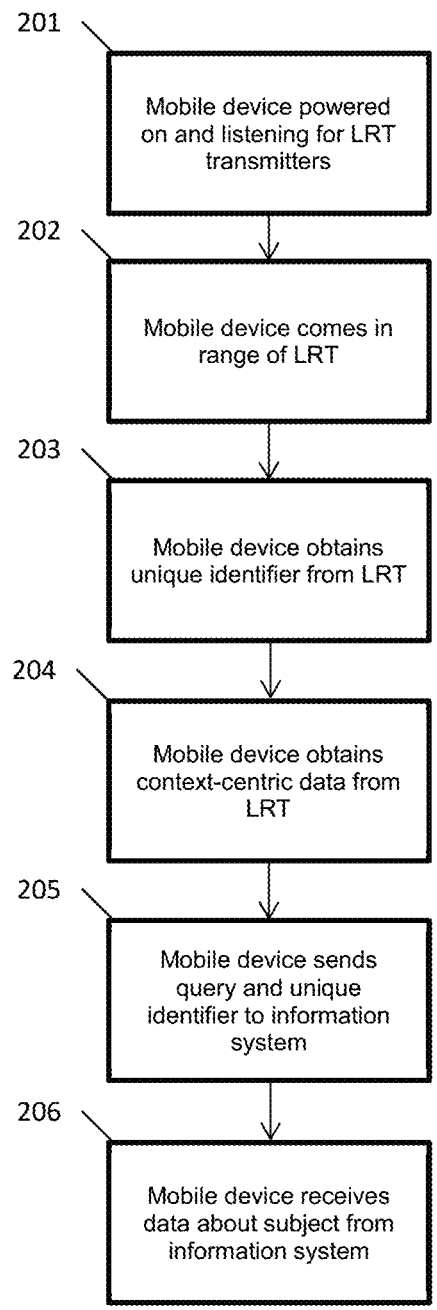
FIG. 2A illustrates a method for receiving information about a subject according to an exemplary embodiment.

FIG. 2A illustrates an exemplary method using the system 100 shown in FIG. 1. As illustrated in FIG. 2A, the method begins when the mobile device 104, 106 is powered on and listens for LRT transmissions using LRT technology (e.g. Bluetooth low energy) in step 201. Subsequently, the mobile device 104, 106 comes within the transmission range of the LRT 102 in step 202. When the mobile device 104, 106 enters the range of the LRT 102, the mobile device 104, 106 may receive LRT 102 transmissions and begin a communication handshake process. For example, if the LRT 102 uses Bluetooth, the mobile device 104, 106 and the LRT 102 may begin a pairing processes defined by Bluetooth standards. Depending on the security settings of the LRT 102, the mobile device 104, 106 may need to receive a password or passcode to pair with the LRT 102. The mobile device 104, 106 may automatically pair with the LRT 102, or the mobile device 104, 106 may need to undergo a set-up process to connect the mobile device 104, 106 and the LRT 102.

After the mobile device 104, 106 and the LRT 102 begin communicating (e.g. the devices are paired), the mobile device 104, 106 receives an identifier representing the subject 101 from the LRT 102 in step 203. The identifier may be a unique identifier for the LRT 102. The unique identifier may take any of a variety of forms. In one embodiment, the unique identifier is a Universally Unique Identifier UUID as described in IETF RFC 4122. In another embodiment, the unique identifier is simply a text string containing human and machine readable characters sufficient to distinguish the LRT 102 from other LRT units configured to convey information about other subjects. Using a real estate-centric example, two houses located next to each other, each equipped with an LRT unit, may both potentially be within the range of portable electronic device 104, 106. In order to distinguish one house from the other, the LRTs 102 are pre-programmed to broadcast unique identifiers. The unique identifier could take the form of a UUID, the postal addresses of the respective houses, the assessor parcel number of the property, or any other scheme that provides sufficient uniqueness for the person 103, 105 to recognize the difference and/or to index the information pertaining to the houses in information system 108.

After receiving the identifier, the mobile device 104, 106 receives context-centric information about the subject in step 204 directly from the LRT 102. By receiving some information directly from the LRT 102, the mobile device 104, 106 may receive some context-centric information without the need for an active network connection other than the short range connection with the LRT 102. Context-centric information is information that is related to the subject 101 and may also include information specific to user's 103, 105 proximity to the subject 101. Context-centric information may be generic to any user in proximity to subject 101, or the context-centric information may account for a user's 103, 105 identity to provide distinct and unique information to each user. If identity is considered, the first user 103 may receive different information about the subject 101 than the second user 105. The amount of information broadcast by the LRT 102 may be limited due to relatively slow network connection speeds.

At step 205, the mobile device 104, 106 sends a query and the identifier to the information system 108 via network 107. The information system 108 uses the identifier to retrieve information about the subject 101 and sends the retrieved information back to the mobile device 104, 106, and the mobile device receives the retrieved information in step 206. Information may be obtained from the information system 108 rather than or in addition to the information directly received from the LRT 102 because the underlying technology used by LRT 102 may have limitations on data transfer rates that make transferring certain types of information, such as photos, video, and audio, impractical to send directly from LRT 102. Information may also come from the information system 108 because the LRT 102 and the information system 108 may have no direct connection, which makes it slow, difficult, or impossible to update information pertaining to subject 101 as it changes over time. Further still, the mobile device 104, 106 may request additional information from the information system 108 because the information system 108 may have specific knowledge about unique users 103, 105 and may thus provide user-specific information pertaining to subject 101.

After receiving information from the LRT 102 or the information system 108, the user 103, 105 may interact with the software on mobile device 104, 106 to view information pertaining to the subject 101. Depending on the subject 101 and the amount and diversity of information pertaining to the subject 101 that is stored in information system 108, it may not be practical to transmit all the information at one time to the mobile device 104, 106. Instead, the information system 108 may transmit summary or salient information along with a table of contents of additional available information. Using the mobile device 104, 106, the user 103, 105 interacts with the information system 108 to obtain additional information. To facilitate information retrieval from the information system 108, the mobile device 104, 106 may relay commands from the user 103, 105 to the information system 108. The software may provide a user interface that both conveys additional information that is available and a means by which the user will indicate which additional information is desired. The specific implementation of the user interface depends on the hardware and software features of the mobile device 104, 106, such as a display screen, a speaker, alpha numeric displays, alpha numeric keyboards, a touch enabled display, a microphone, and gyroscopes.

In a real estate example, the user 103, 105 may view information pertaining to a property for sale including, but not limited to, the size of the property in square feet or meters; the number of bedrooms, bathrooms, half baths, garage bays, and parking spaces; the year the house was built; the style of construction; the type of heating and cooling system; the features and amenities of each room; the types and quality of floor, wall, counter and trim materials; the types and quality of plumbing and lighting fixtures; the size and dimensions of the lot or land; the fees and schedule for homeowner association dues; and the annual local taxes. A listing price for the real estate may be included in either or both of the information sent by the LRT 102 and the information sent by the information system 108.

The user 103, 105 interacts with the software on device 104, 106 to request additional data from the information system 108, such as photographs pertaining to the subject 101; videos, slideshow presentations, 3D virtual tours, history of prior sales, plot maps, tax records, satellite photos, flood maps, earthquake history, geological surveys, and street maps. The information system 108 transmits additional information through network 107 to the mobile device 104, 106, and the mobile device 104, 106 displays the additional information to the user 103, 105.

In some embodiments, the user 103, 105 may determine by examining the available information about subject 101 that they desire to view information about other subjects that share similar characteristics to the current subject 101. In this embodiment, the user 103, 105 interacts with the information system 108 using the mobile device 104, 106 to search the database 110 for subjects that match user-specified criteria specified. Based on the user-specified criteria, the information system 108 transmits a list of matching subjects to the mobile device 104, 106, and the user 103, 105 may choose to view the information about the subjects matching the user-specified criteria. For instance, once again returning to the real estate example, the mobile device can send a request to the information system to find "comparables" to a given real estate subject for which the mobile device is within range of the real estate subject's LRT 102.

Figure 3:
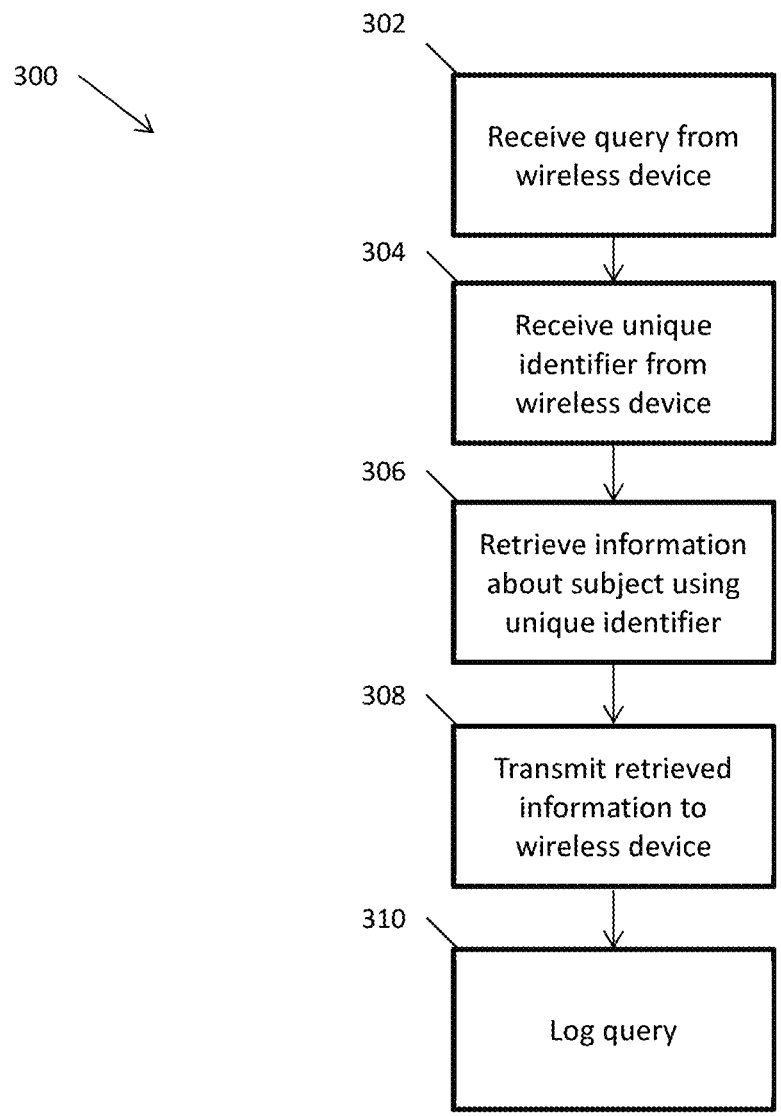
FIG. 3 illustrates a method for sending information about a subject by an information system according to an exemplary embodiment.

FIG. 3 illustrates an exemplary method 300 for sending information about the subject 101 by the information system 108. The method 300 begins in step 302 when the information system 108 receives a query request from the wireless device 104, 106 over the network 107. The query may include a request for information about the subject 101. Subsequently, previously, or contemporaneously with step 302, the information system 108 receives a unique identifier for the subject 101 in step 304. The wireless device 104, 106 received the unique identifier from the LRT 102 and subsequently sent the unique identifier to the information system 108.

Using the unique identifier, the information system 108 retrieves information about the subject in the database 110 in step 306. The server 109 uses the unique identifier to find information that corresponds to the subject 101 in the database 110.

After the information system 108 retrieves the information about the subject, the information system 108 transmits the retrieved information to the wireless device 104, 106 over the network 107 in step 308.

Finally, the information system 108 logs a record in the database 110 containing details about the query from the mobile device 104, 106 about the subject 101. For example, the information system 108 may store data about the information request, such as the date and time, length of the session, what information was transmitted, what additional information was requested, etc. As another example, in a real estate example, the system can track the time a user spends in each area of a real estate property by logging how long the user's mobile device remains paired with various LRTs that are positioned throughout the real estate property. For example, if a first LRT is located in a bedroom and a second LRT is located in the kitchen, the system can generate data indicative of how long the user spent in each room based on how long the user's mobile device was paired with the bedroom LRT and the kitchen LRT. Further still, the mobile application 550 can be configured to solicit feedback information from the user about the real estate property, such as ratings per room, surveys, and/or free-form text commentary. In aggregate, the records saved to the database 110 are used to generate analytics or statistics about the behavior of users 103, 105 with respect to their interest in the subject 101.

Figure 6:
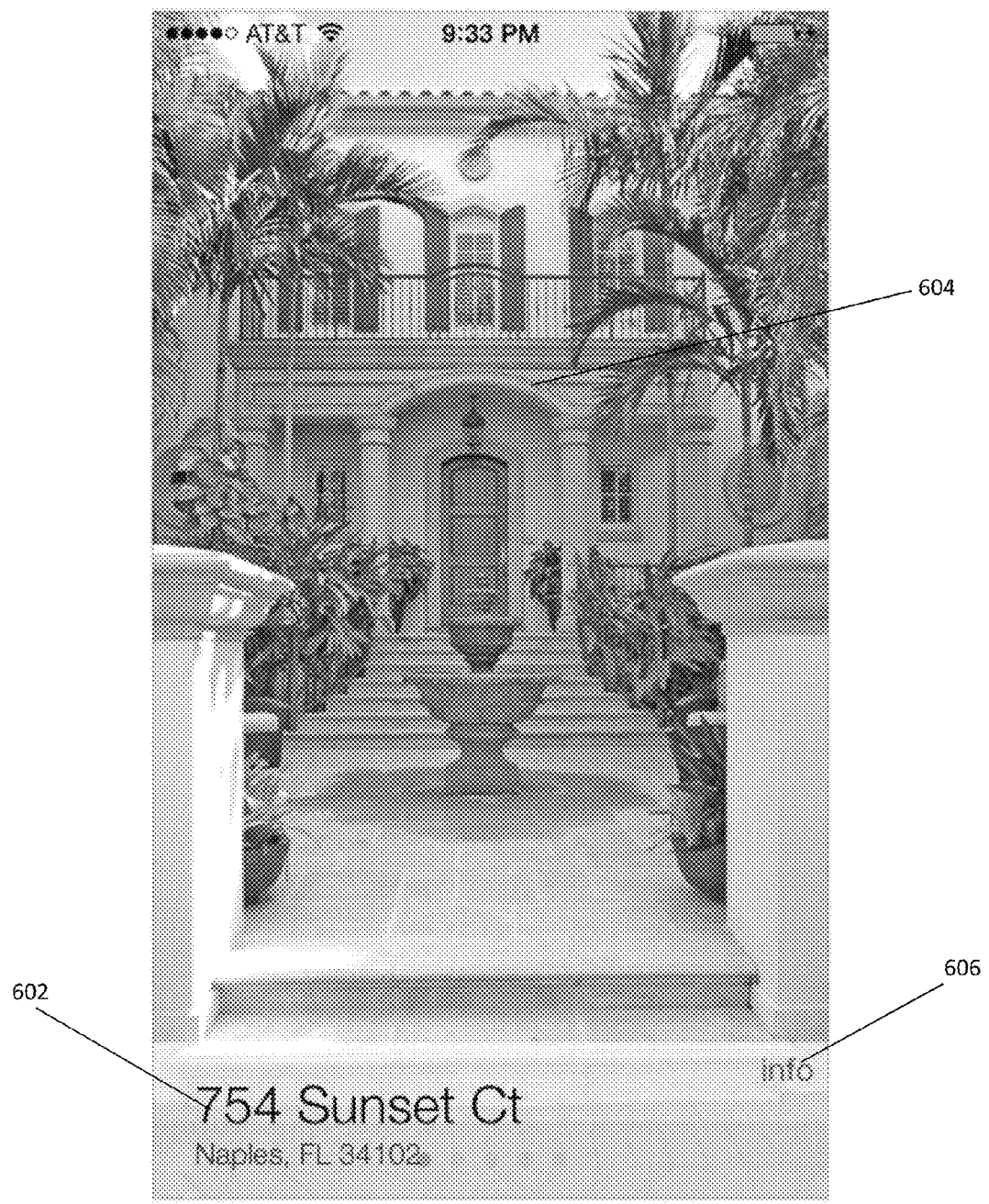
FIG. 6 illustrates a first example graphical user interfaces for a mobile application according to an exemplary embodiment.

FIGS. 6-9 illustrate examples of graphical user interfaces (GUIs) that can be presented to users via an exemplary mobile application 550 (which continues with the real estate examples discussed above). For example, if a prospective purchaser were walking or driving down the street where a property was for sale, that property may be associated with the LRT 102, and the LRT 102 may broadcast information about the property. Referring to FIG. 6, when the mobile device 104, 106 comes within range of the LRT 102 associated with the available property, the mobile application 550 receives an identifier from the LRT 102 for the property. The mobile application 550 may also receive additional information from the LRT 102 such as an address for the property, an image of the property, and/or a listing price for the property. The mobile application 505 can process such received information and notify the user that information about a nearby house is available through a GUI. For example, with reference to FIG. 6, upon entering the LRT's 102 range, the application 550 may display information about the available property, such as the address 602 of the available property and a picture of the available property 604.

Figure 7:
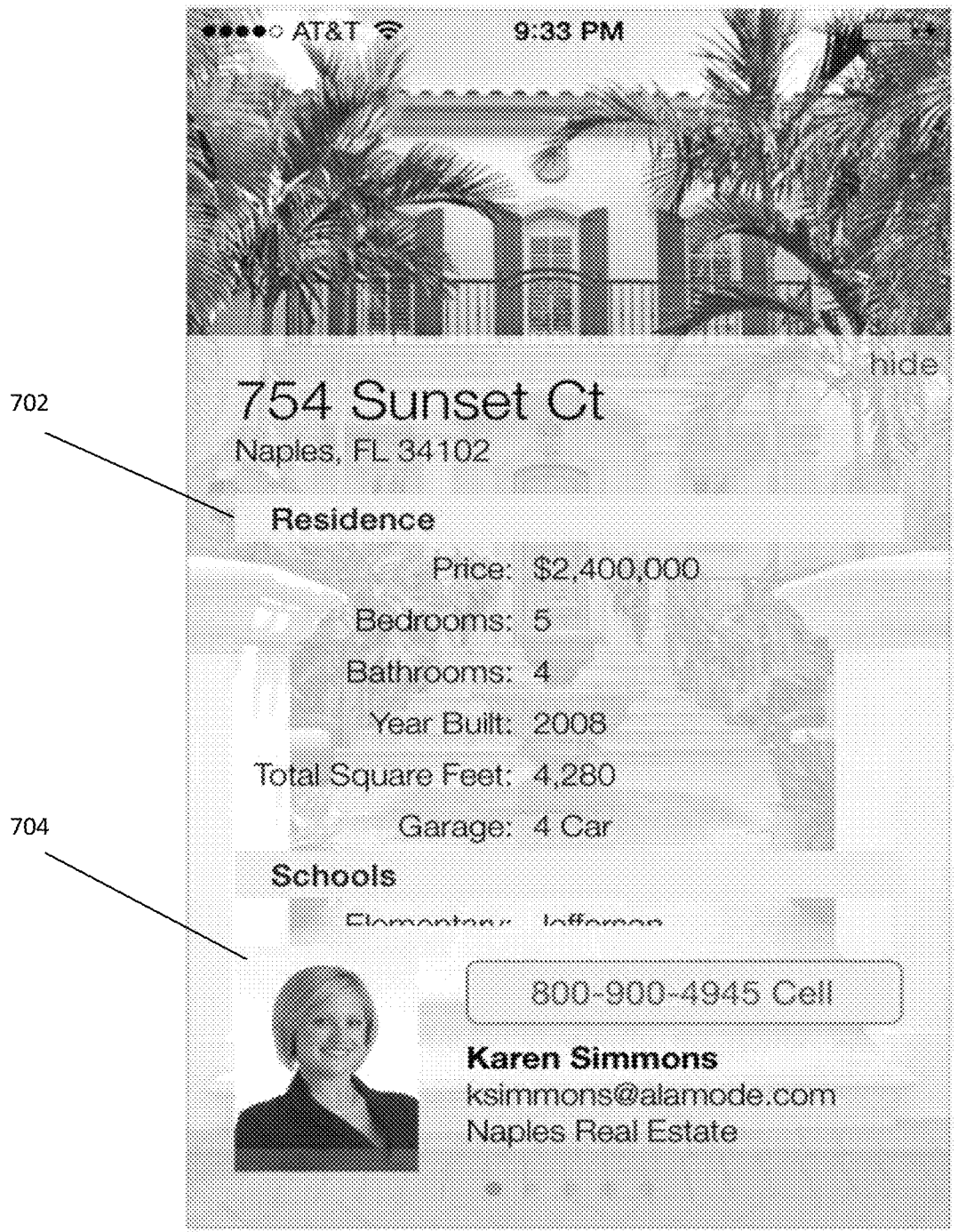
FIG. 7 illustrates a second example graphical user interfaces for a mobile application according to an exemplary embodiment.

If the user desires more information about the property, the mobile application 550 can provide the user with access to such additional information via user selection of the info button 606. Upon selection of the info button 606, the application 550 may request information from the information system 108, or the application 550 may access information already received from the LRT 102 or information system 108. After the user selects the info button 606, a GUI such as that shown in FIG. 7 may appear. As shown in FIG. 7, the application 550 displays detailed information about the property 702, such as price, number of bedrooms, number of bathrooms, year built, total square feet, garage size, school zones, and many other pieces of information. The application 550 also displays information about the realtor 704, such as the realtor's contact information, company affiliation, and a picture of the realtor.

Figure 8:
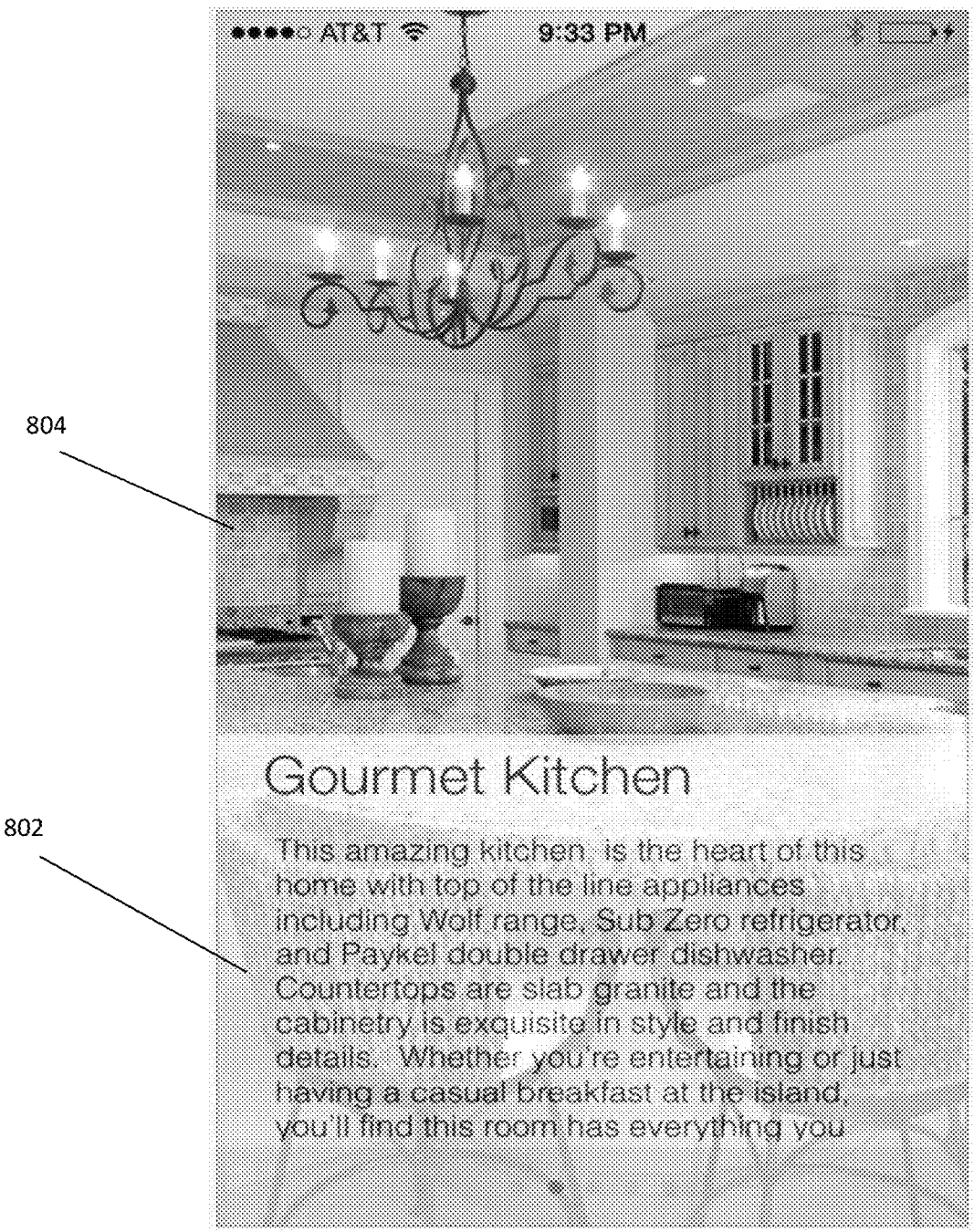
FIG. 8 illustrates a third example graphical user interfaces for a mobile application according to an exemplary embodiment.
Figure 9:
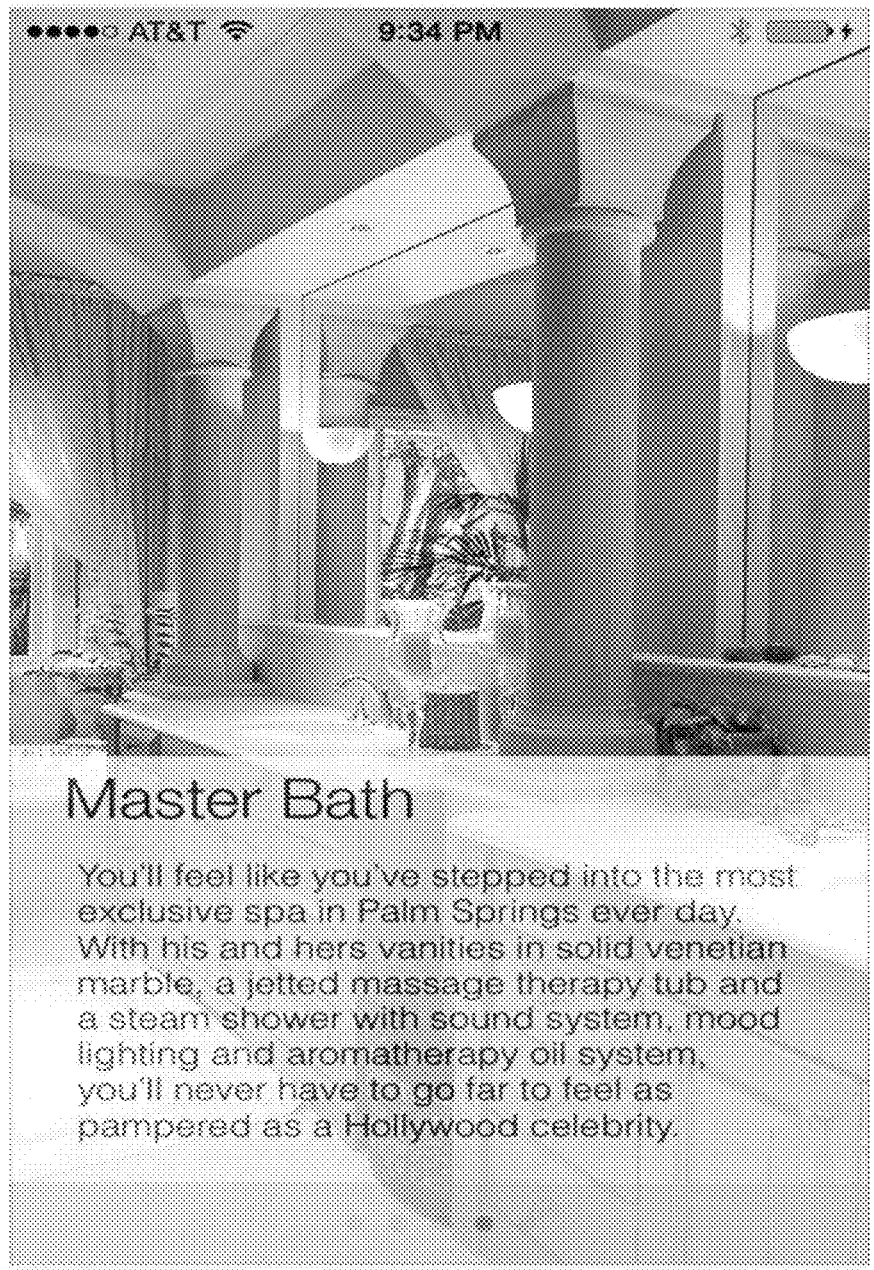
FIG. 9 illustrates a fourth example graphical user interfaces for a mobile application according to an exemplary embodiment.

Furthermore, an individual LRT 102 may be positioned within each room of the property. The range of such room LRTs 102 may be shorter than a main LRT 102 associated with the property generally. These room LRTs 102 can be configured to broadcast room-specific information over their limited ranges. Thus, when the user enters the range of the room LRT 102, the application 550 is able to receive and display information about the room. FIG. 8 illustrates an exemplary GUI that a user may see when entering the kitchen of a property. Referring to FIG. 8, the application 550 may display information about the room 802 and a picture of the room 804. FIG. 9 illustrates another example of an individual room information screen when the user enters the master bathroom.

In some embodiments, rather than employing multiple LRTs in different rooms, the system can be configured to provide room-specific information via information provided to the mobile application 550 from information system 108 (or from a single LRT 102 for the property). The mobile application can then provide navigational features that permit the user to browse the room-specific information.

In embodiments where multiple LRTs are deployed in relative proximity to each other, this creates a technical challenge in resolving which LRT is of interest to the user.

Figure 2B:
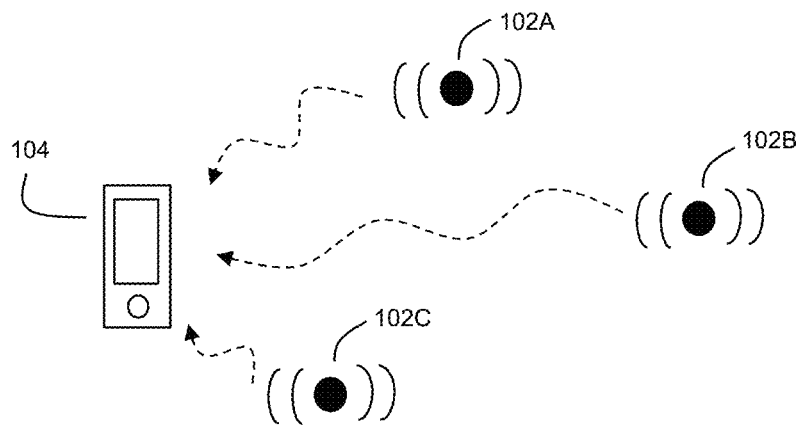
FIGS. 2B-2I illustrate examples of techniques for resolving which of multiple limited range transceivers are to be selected for presentation of data to a user.
Figure 2C:
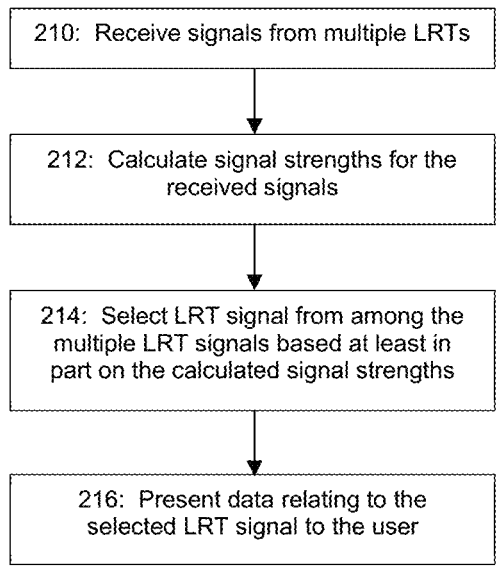

FIG. 2B depicts an example of a multiple LRT scenario where LRTs 102A, 102B, 102C, . . . are in signal range of a user's mobile device 104 (or 106). When two subjects are in close proximity to each other, the mobile device 104, 106 may be able to measure a signal strength emitting from the LRTs 102. Based on the signal strength, the mobile device 104, 106 may choose the subject 101 having the strongest LRT signal strength. FIG. 2C depicts an example process flow performed by a mobile device 104/106 in this regard.

At step 210, the mobile device receives signals from multiple LRTs 102. At step 212, the mobile device processes the received signal and the application 550 determines a strength values for the received signals. Step 212 can be performed in any of a number of ways. For example, some limited range transmission technologies provide hardware and/or software interfaces for querying the signal strength of the underlying transmission medium. An example of this includes Bluetooth low energy technology, where mobile devices that employ Bluetooth low energy technology can be configured with a receiver that measures a signal strength for a received Bluetooth low energy signal, and a mobile application executing on the mobile device can then calculate this signal strength by reading the measured signal strength via an interface to the Bluetooth receiver. A correlation can then be made between the calculated strength of the signal and the distance between the mobile device receiving the signal and the LRT broadcasting the signal.

At step 214, the mobile device selects an LRT from among the multiple LRTs based at least in part on the calculated signal strengths. In an example embodiment for step 214, the mobile device may compare the calculated signal strengths, determine which of the calculated signal strengths is the strongest, and then select the LRT corresponding to the strongest signal strength under an assumption that the LRT 102 having the strongest signal strength is the LRT 102 nearest to the mobile device 104, 106. In this way, a user does not need to select which subject 101 about which they desire information. After making a determination as to which signal strength is strongest, the mobile device 104, 106 may pair with the LRT 102 emitting the strongest signal. However, it should be understood that signal strength need not be the only factor considered at step 214 when selecting from among multiple received LRT signals, examples of which are described below.

After an LRT has been selected at step 214, the mobile device then presents data for the selected LRT to the user (step 216). For example, the mobile device can render information transmitted by the selected LRT for display via a touchscreen interface of a smart phone.

Figure 2D:
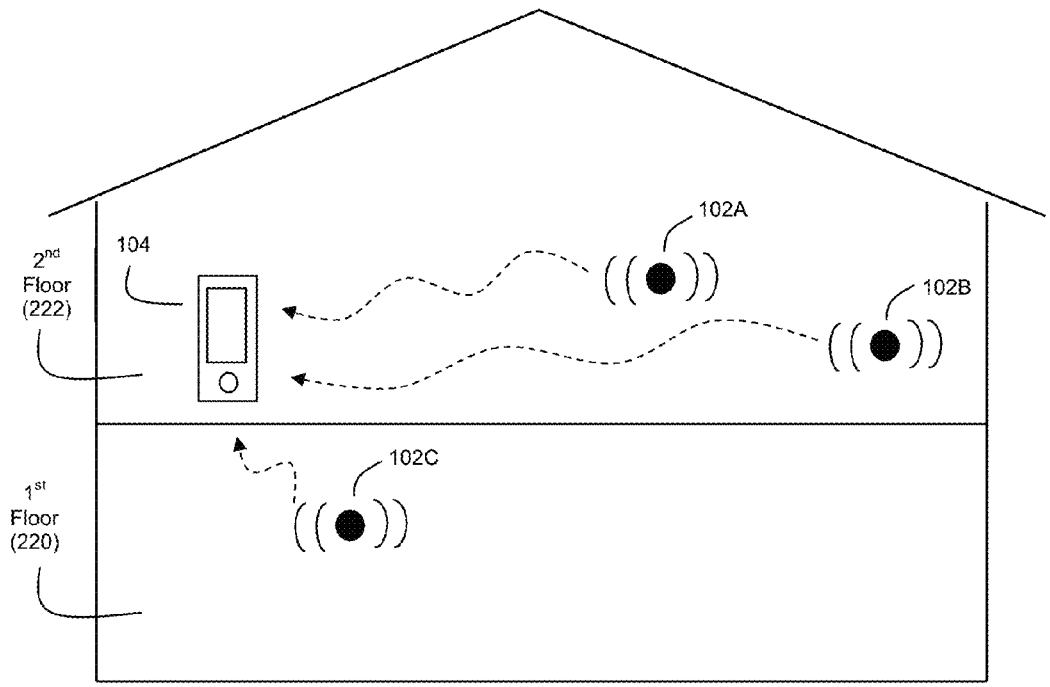

FIG. 2D depicts an example scenario where a mobile device 104 (or 106) resolves between multiple LRTS based on signal strength and other information. In the example of FIG. 2D, the multiple LRTs 102 are positioned inside real estate property such as a home, building, or apartment. The real estate property include a first floor 220 and a second floor 222. LRTs 102A and 102B are positioned on the second floor 222 while LRT 102C is positioned on the first floor 220. In situations where LRTs are positioned on multiple floors of a structure, it may be desirable for the mobile device to select an LRT that is positioned on the same floor on which the mobile device is located. In such a situation, because a first LRT 102 may be located closer to the mobile device 104/106 than a second LRT 102, but the first LRT 102 may be located on a different floor than the second LRT 102, signal strength alone may not be sufficient to resolve which LRT should be selected. An example is shown by FIG. 2D where LRT 102C is closest to the mobile device 104 and thus likely has the strongest signal, but LRTs 102A and 102B are located on the same floor and are thus more likely to have data of interest for the user.

Figures 2E, 2F:
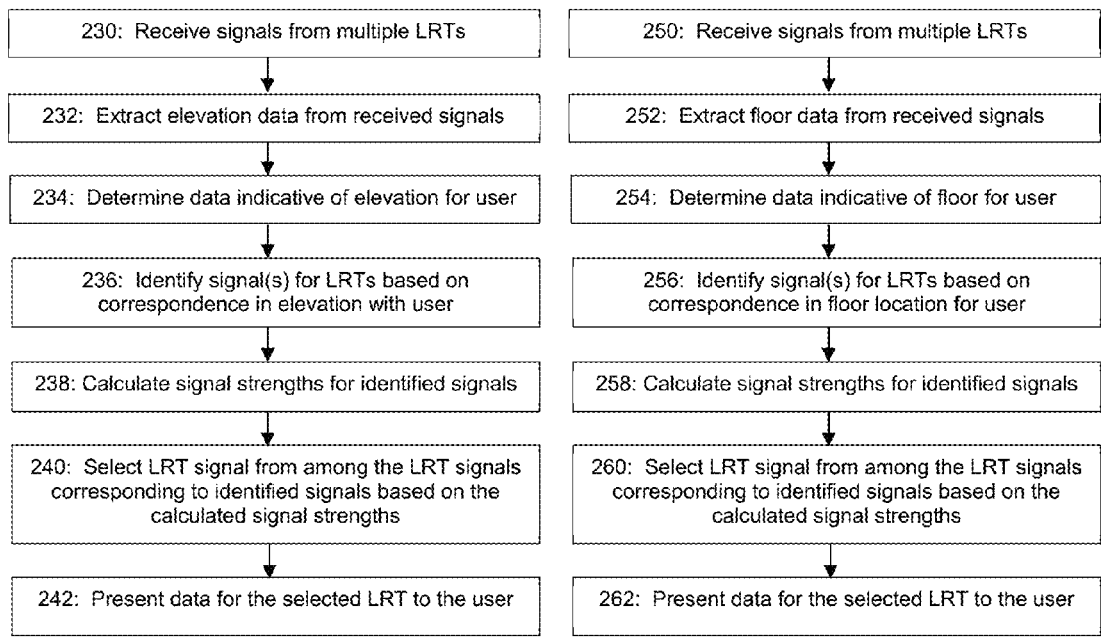

FIG. 2E depicts an example process flow for resolving which LRT 102 should be selected in a scenario where the LRTs 102 may be positioned on different floors of a structure. At step 230, the mobile device receives signals from multiple LRTs. These signals may include data indicative of an elevation for each LRT. For example, each LRT 102 may be configured to broadcast data indicative of its elevation (e.g., X feet) within its signal. The LRT 102 can learn its elevation in any of a number of ways. For example, the LRT 102 may include an altimeter, in which case the LRT 102 can be programmed to learn its elevation based on data from the altimeter and insert this elevation into its broadcast signal. As another example, the LRT 102 can be programmed with an elevation value at the time of set-up by an administrator or the like. This programmed elevation value can then be transmitted within the broadcast signal. At step 232, the mobile device extracts the elevation data from each received signal.

At step 234, the mobile device determines data indicative of an elevation for the user. The mobile device may determine this elevation-indicative data in any of a number of ways. For example, some LRTs may be positioned to provide elevation resolution capabilities for the mobile device. This can be achieved, for example, by deploying LRTs at ingress and egress locations for floor transitions, for example at the bottom and top of stairwells and/or at each entrance to an elevator. Each LRT dedicated to elevation resolution has an association with data indicative of elevation (e.g., the LRT at the bottom of the stairwell having an association with "Floor 1" while the LRT at the top of the stairwell has an association with "Floor 2"). Because the user 103,105 must pass within close proximity to one of these dedicated LRTs when transitioning from one elevation to another, the mobile device 104, 106 can determine the active floor for the mobile device as the mobile device pairs with these dedicated LRTs based on the last dedicated LRT for which the signal strength calibration was indicative of a floor transition. During set up of LRTs within a property, a configurable setting for an LRT can define whether that LRT serves as an elevation transition indicator. Thus, by way of example, an administrator can program the LRTs that are deployed at the ingress and egress locations for floor transitions to flag those LRTs with regard to them being indicative of a floor transition as well as their associated floor. Optionally, the device 104, 106 can maintain a history of recent LRTs and their respective signal strengths and elevation data to maintain a "best guess" for which floor it is on.

In another example, the LRTs and mobile device can cooperate to provide a guided tour of the structure for the user, in which the user is guided through a sequence of rooms. Based on an assumption that the user follows this sequence, the mobile device can determine that an elevation transition will occur after a last room on a floor, in which case an elevation transition can be assumed after the LRT for this last room of the floor for the guided tour is the most recently paired LRT. This is slight variation on the use of dedicated LRTs located at elevation transition points and can be applied in situations where it is known that the user 103, 105 is likely to follow a specified path through a structure.

As another example, the mobile device may include an altimeter, in which case the mobile device can determine its current elevation based on data from the altimeter.

At step 236, the mobile device identifies one or more of the received signals based on a determined correspondence in elevation between the received signal(s) and the elevation data for the user. For example, step 236 can identify the signal(s) having a broadcast elevation within some defined tolerance of the elevation determined for the mobile device at step 234. In an instance where only one of the received signals is deemed to be an elevation match, then this signal can be selected for pairing and ultimate presentation to the user. However, in an instance where multiple received signals are deemed to be an elevation match, then additional resolution may be needed. For example, in FIG. 2D it is shown that there are two LRTs (102A and 102B) on the second floor 222. Thus, when the user is located on the second floor, step 236 results in the identification of the signals from LRTs 102A and 102B as being at the same elevation as the mobile device 104. To further resolve between these LRTs, steps 238 et seq. are performed. At step 238, the mobile device calculates the signal strengths for each identified signal. At step 240, the mobile device selects the LRT having the strongest calculated signal strength (which is expected to be LRT 102A in the example of FIG. 2D). At step 242, the mobile device presents data for the selected LRT to the user (e.g., LRT 102A for the FIG. 2D example). Thus, the process flow of FIG. 2E operates to disregard LRT 102C while the user's mobile device 104 is located on the second floor 222 even though LRT 102C is closer to the mobile device 104 than LRT 102A and the mobile device likely receives a stronger signal from LRT 102C than from LRT 102A.

FIG. 2F depicts another example process flow for resolving which LRT 102 should be selected in a scenario where the LRTs 102 may be positioned on different floors of a structure. In this example, the signals broadcast by the LRTs include an identification of the floor on which each LRT is positioned. For example, when an LRT 102 is set up at a particular location in the structure, an administrator can program the LRT 102 with a floor identifier, and the LRT can include this floor identifier in its broadcast signal (e.g., "Floor 2"). The mobile device receives signals from multiple LRTs (step 250) and extracts the floor data from these signals (step 252).

Step 254 can proceed similarly to step 234 described in connection with FIG. 2E, but where floor information is used rather than elevation. In an example where the mobile device includes an altimeter, the mobile device can determine an elevation for each floor as the mobile device pairs with LRTs. Based on an assumption that the user will enter a structure at the ground floor, the mobile device can determine that the elevation of the mobile device when the mobile device pairs with a first LRT upon entering the structure is the elevation of the ground floor. Thus, when the sensed current elevation for the mobile device changes by more than some threshold (e.g., +/−10 feet), the mobile device can determine that the current floor for the user has changed. Thereafter, steps 256-262 can proceed in similar fashion to steps 236-242 of FIG. 2E.

Figure 2G:
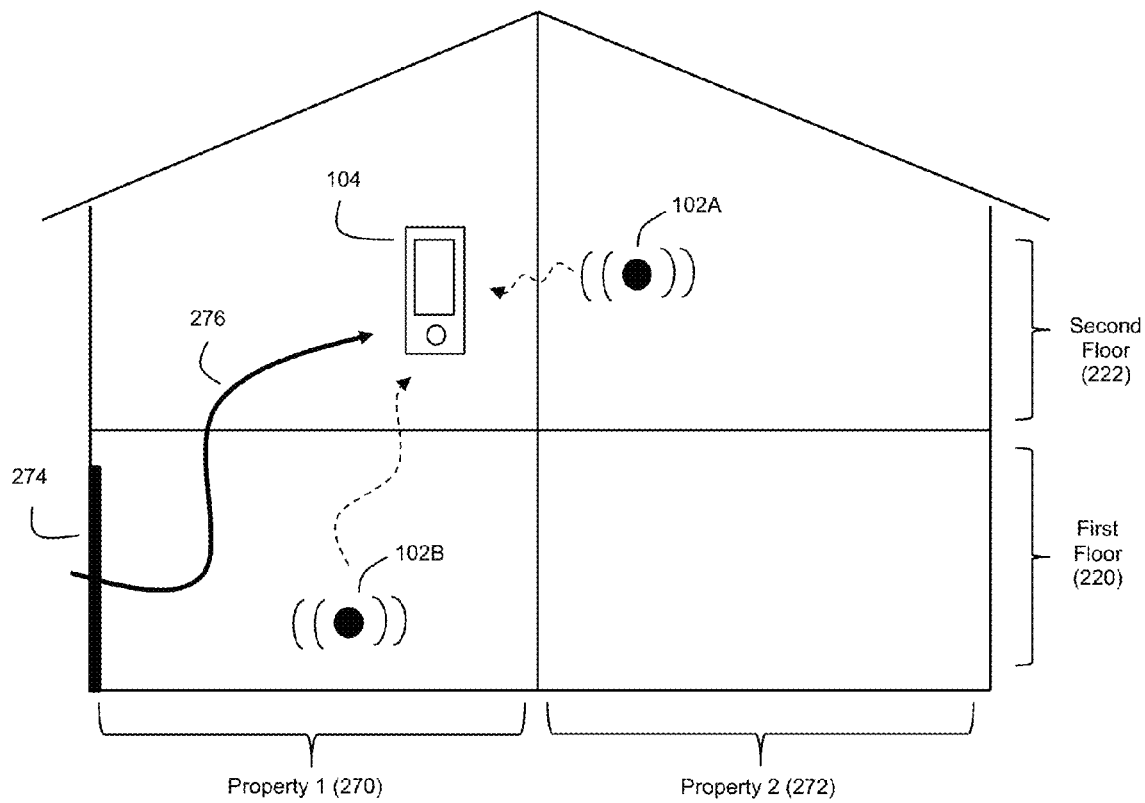

FIG. 2G depicts yet another example scenario where LRT resolution may be needed. In the example of FIG. 2G, a structure includes separate properties 270 and 272, where each property encompasses two floors of the structure. A user may be interested in learning about Property 1 (270) but not Property 2 (272). However, as the user enters Property 1 through door 274 and follows path 276 from the first floor 220 of Property 1 to the second floor 222 of Property 1, the user may be in a situation where the closest LRT with the strongest signal is an LRT 102A in Property 2 rather than LRT 102B in Property 1. In this case, even though LRT 102A is on the same floor as the mobile device 104, it is desirable to disregard LRT 102A while interacting with the user about Property 1. To aid resolution, the signals broadcast by the LRTs may also include a property identifier. Thus, the signal transmitted by LRT 102A can include data that identifies Property 2 while the signal transmitted by LRT 102B can include data that identifies Property 1.

Figure 2H:
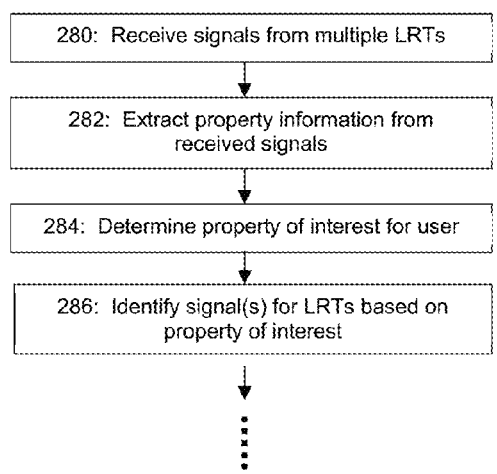

The example process flow of FIG. 2H can be performed to make an appropriate LRT selection for a scenario such as that shown by FIG. 2G. At step 280, the mobile device receives signals from multiple LRTs. At step 282, the mobile device extracts the property information from these signals. Then, at step 284, the mobile device determines a property of interest for the user. Step 284 can be performed in any of a number of ways. For example, the mobile device can receive input from the user that identifies the property of interest. Once the user identifies the property of interest, the mobile device can disregard the signals from LRTs that do not include an identifier for the property of interest (even if those signals are stronger than the LRT signals from the property of interest, as described with step 286). As another example, the mobile device may determine that the property of interest is the property identified by the first LRT with which the mobile device pairs when the user enters the structure (where the mobile device can be configured to select, for the first pairing, the LRT having the strongest signal). As yet another example, the mobile device can determine the property of interest based on which property is identified by the most signals it receives at a given time. For example, if 5 of the 6 received LRT signals are for Property 1, then the mobile device may conclude that Property 1 is the property of interest. At step 286, the mobile device identifies the signal(s) based on a match with respect to the determined property of interest. If there is a received signal for which there is no match with respect to the determined property of interest, step 286 disregards that received signal even if its strength is greater than the strength of a received signal for which there is a match with respect to the property of interest. If only one matching signal is identified at step 286, then the LRT for that signal can be selected for pairing with the mobile device. If multiple matching signals are identified at step 286, then the process flow can continue with steps such as those shown by any of FIG. 2C, 2E, or 2F to further resolve which LRT should be selected.

Figure 2I:
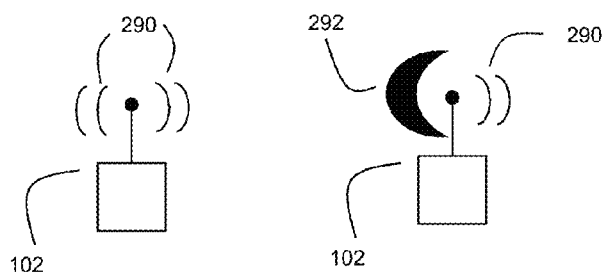

As another example of how LRT resolution can be aided, the signals from one or more LRTs may be directionalized. For example, as shown by FIG. 2I, an LRT 102 may comprise an aiming dish 292 made out of a material that redirects the radio waves 290 emitting from the LRT 102 and prevents the radio waves 290 from emitting in a certain direction. In this way, the aiming dish 290 may comprise a Faraday shield that prevents radio waves from traveling in some directions and thus causes the LRT's 102 signal to be aimed in a designated direction. This can be seen by way of comparison in FIG. 2I where the LRT 102 on the left (which does not include an aiming dish 292) broadcasts its signal 290 in all directions, while the LRT 102 on the right includes an aiming dish 292 that directs the signal 290 in a desired direction and blocks signal propagation in other directions. It should be understood that aiming dish 292 can be mounted to the LRT 102 in an adjustable manner such that the signal 290 can be steered in a desired direction by adjusting the position and/or orientation of the aiming dish relative to the LRT's antenna.

Thus, it can be seen that with example embodiments, multiple LRTs 102 can be located at a plurality of positions within a structure such as in different rooms of a home or apartment. These LRTs can be programmed to broadcast room-specific data for consumption by a user via the user's mobile device. Furthermore, these LRTs can include data within their signals that aids the mobile device with respect to resolving which LRT is likely to most relevant to the user's experience. Thus, a first LRT 102 can be positioned and programmed as the main LRT for the house, and where this main LRT broadcasts data about the house as a whole (and whose broadcast signal may include an LRT identifier, a property identifier, a floor/elevation identifier, and/or home information). A second LRT 102 can be positioned in a main living room, while a third LRT 102 can be positioned in a kitchen, a fourth LRT 102 can be positioned in a bedroom, and so on, with each LRT programmed to broadcast information about the room in which it is positioned, including information such as elevation or floor number if applicable. As the user proceeds from room to room, the mobile device may be configured to automatically and without input from the user, present room-specific data to the user as the mobile device automatically pairs with nearby LRTs 102.

Many of the examples illustrated herein relate to real estate. However, the exemplary embodiments are not limited to real estate. All examples are simply for the purpose of illustration and are not intended to limit the application of the exemplary embodiments. For example, a museum may install multiple LRTs 102 such as positioning a different LRT 102 near different items such as exhibits, paintings, sculptures or other attractions, etc. As a patron wanders around the museum, his mobile device 104, 106 may display information about an exhibit whenever the mobile device 104, 106 enters the range of the exhibit's LRT 102. For example, if a patron stops to view a first painting, the mobile device 104, 106 may receive a unique identifier for the first painting and possibly information about the first painting. Once the patron moves to view a second painting, the mobile device 104, 106 updates with new information about the second painting once the signal strength of the second painting's LRT 102 becomes stronger than the signal strength of the first painting's LRT 102.

Thus, in either the real estate or the museum examples, the application 550 with the aid of LRTs 102 may provide a "guided" tour of a home or museum. For example, as a person walks into a museum, the front entrance may be equipped with a first LRT 102. The first LRT 102 may broadcast a unique identifier and general information about museum. The information received by connecting to the first LRT 102 may include directions to a first attraction along the "guided" tour. The first attraction may have its own LRT 102. The information received about the first attraction's LRT 102 may direct the person to the second attraction along the "guided" tour. The directions may say, for example, "to see the second attraction, turn right and walk 15 feet," or the like. So, in addition to information about each attraction, connecting to an LRT 102 may provide directions to the locations of other LRTs 102.

To initially configure or set up an LRT 102 for operation, a computing device such as a mobile computing device can be used. To configure an LRT 102, an administrator may use an administrator version of a mobile application 550 that allows the administrator to configure the LRT 102. Configuring the LRT 102 may include giving the LRT 102 a unique identifier, programming the data to be broadcast by the LRT, programming a position of the LRT 102, giving the LRT 102 context (e.g. the location of other nearby LRTs 102), or any other program settings.

Figure 10:
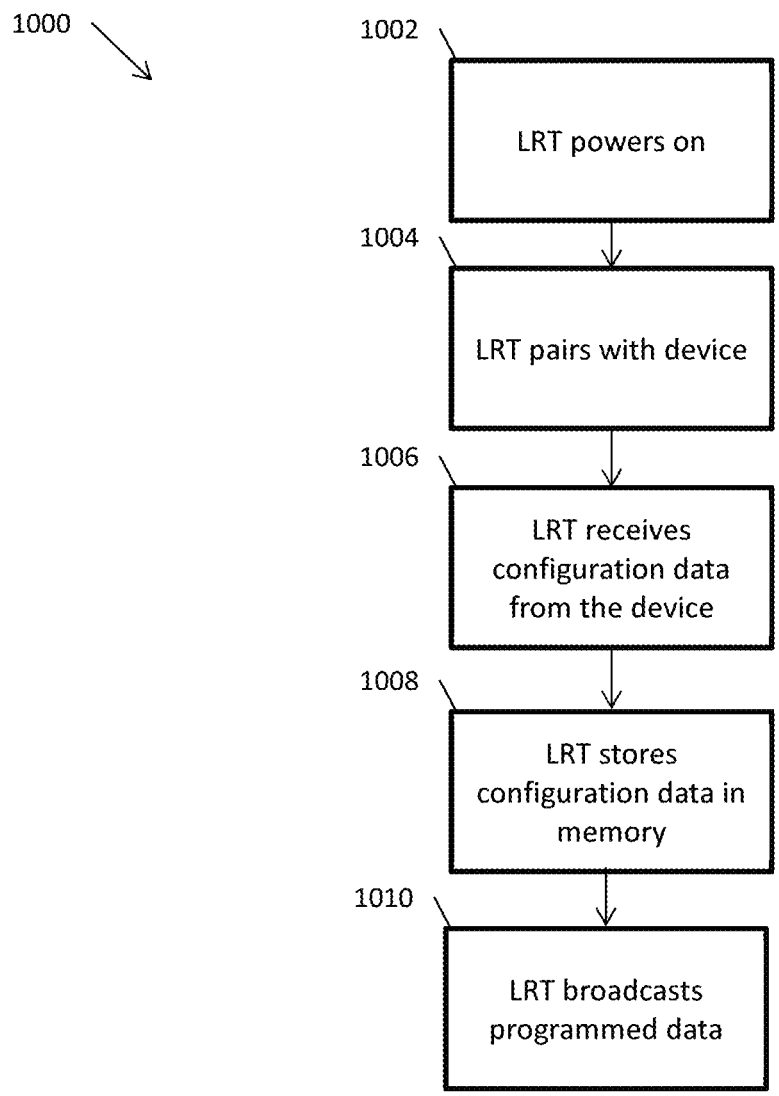
FIG. 10 illustrates an example method for initializing the LRT 102 according to an exemplary embodiment.

Referring to FIG. 10, an example method 1000 for initializing the LRT 102 is illustrated. The method 1000 begins in step 1002 when the LRT 102 powers on. After the LRT 102 is powered on, the LRT 102 may pair with a computing device such as mobile device 104, 106 in step 1004. Once paired with the computing device, the LRT 102 receives configuration data from the computing device in step 1006.

As noted, the configuration data may include a unique identifier for the LRT 102 and summary data to be broadcast by the LRT 102. The LRT 102 stores the configuration data in its memory in step 1008. The administrator application 550 may receive information from the information system 108 in order to configure the LRT 102. For example, the administrator application 550 may request a unique identifier for the new LRT 102 from the information system 108. The administrator application 550 may provide some context information about the LRT 102, such as a property address were the LRT 102 is to be placed or an exhibit number associated with the LRT 102. The information system 108 may issue a unique identifier and associate that unique identifier with the context information. For example, the information system 108 may associate the property address with the issued unique identifier. The LRT 102 may also receive information inputted by the administrator through the mobile device 104, 106. For example, the administrator may type summary information into the administrator application 550 and send that summary information to the LRT 102 so that the LRT 102 broadcasts the summary information with the unique identifier.

After the LRT 102 is configured, the LRT 102 broadcasts the programmed and configured information.

Figure 11:
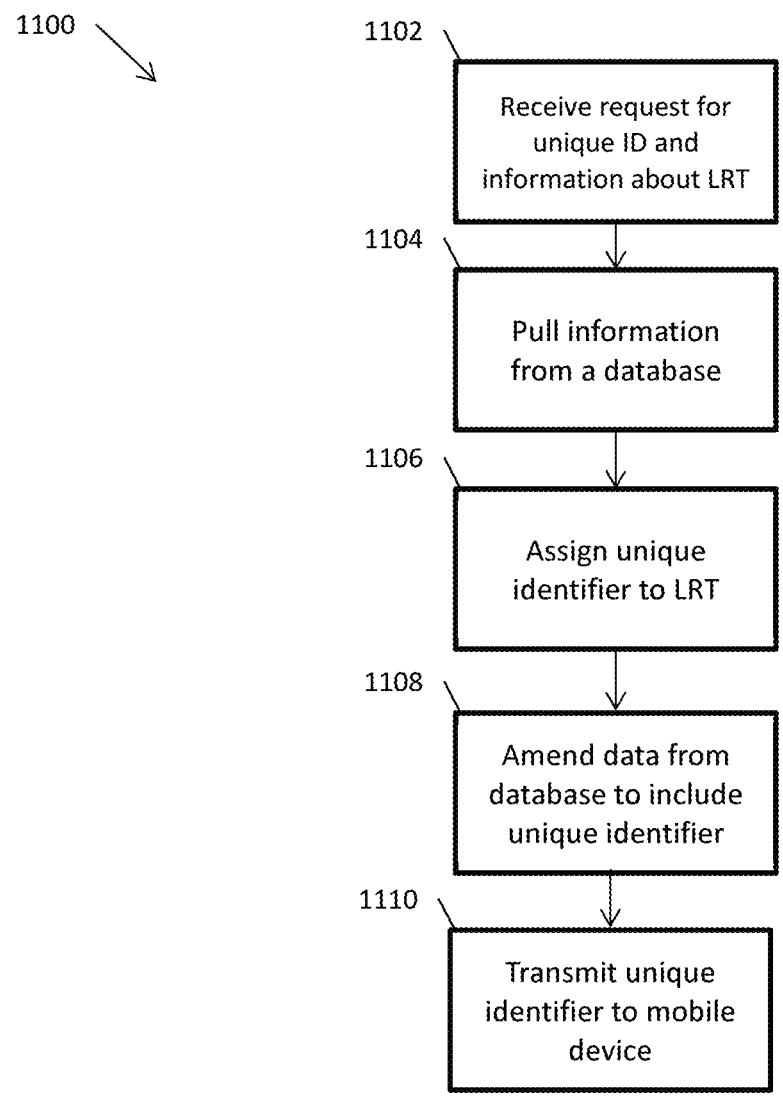
FIG. 11 illustrates an example method for referencing data in a database according to an exemplary embodiment.

As described above, the information system 108 may associate information in a database 308 with a unique identifier when issuing the unique identifier. FIG. 11 illustrates the database identifier association method 1100. The method 1100 begins in step 1102 when the information system 108 receives a request for a unique identifier. The request for a new identifier may come from a mobile device 104, 106 that is used to configure the LRT 102 via the administrator application 550. The request for a unique ID may include information about the location of the LRT 102, such as an address of a property.

Using the information about the LRT 102, the information system 108 may be configured to access a database to obtain data about the subject to be associated with the LRT in step 1104. In the real estate example, the information system 108 may use the address of the property to pull information from a multiple listing service (MLS) database. The MLS database may include data about the property, such as the realtor, the price, the address, number of bedrooms, square footage, school zones, or any other data. In a museum example, the database may include information about each exhibit.

After retrieving the information from a database (e.g. MLS database) about the subject, the information system 108 may assign the LRT 102 a unique identifier in step 1106. Using the unique identifier, the information system 108 may create an association between the retrieved subject data pulled and the unique identifier. For example, a retrieved record from an MLS database can be augmented to include a unique identifier column. Tables 1 and 2 illustrate such a process of tying subject data from a database to the unique identifier of an LRT. It should be noted that Tables 1 and 2 may illustrate only a portion of all the data stored by an MLS database.

TABLE 1

| Address | Price | Realtor | Square Footage |
|---|---|---|---|
| 907 Main Street | $1,000,0000 | Jane Smith | 4,000 |
| 200 La Salle St. | $500,000 | John Smith | 2,500 |
| 1010 Clark St | $750,000 | Dan Johnson | 3,500 |

TABLE 2

| Address | Price | Realtor | Square Footage | Unique ID |
|---|---|---|---|---|
| 907 Main Street | $1,000,0000 | Jane Smith | 4,000 | ABC123 |
| 200 La Salle St. | $500,000 | John Smith | 2,500 | DEF456 |
| 1010 Clark St | $750,000 | Dan Johnson | 3,500 | GHI789 |

As shown in Table 1 and 2, the information from the MLS database (shown in Table 1) is amended to include a new column with the unique identifier.

Once the retrieved subject data has been amended to include the unique identifier, the information system 108 transmits the unique identifier to the mobile device 104, 106, and the mobile device assigns the unique identifier to the LRT 102 using the administrator application 550 in step 1110. Also, the information system 108 may store the subject data in database 110 in association with the unique identifier for the LRT.

FIG. 10 illustrates a method where the information system 108 assigns a unique identifier to the LRT 102, and the LRT 102 broadcasts the assigned unique identifier after configuration. In another embodiment, the LRT 102 may have a fixed identifier, such as a MAC address. If the LRT 102 has a fixed identifier, the mobile device 104, 106 may upload the fixed identifier to the information system 108 during configuration of the LRT 102, and the information system 108 may associate data in the database 308 with the fixed identifier. According to the exemplary embodiments, the LRT 102 may broadcast either an assigned unique identifier or a fixed identifier.

In view of the foregoing, it will be seen that the several advantages of the invention are achieved and attained.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "receiving" or "establishing" or "connecting" or "sending" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one processor, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A system comprising:
a plurality of limited range wireless transmitters located at a plurality of positions within a real estate property, each limited range wireless transmitter configured to wirelessly transmit a limited range signal that includes information about the real estate property and information indicative of the position at which the limited range wireless transmitter is located, wherein a plurality of the limited range signals include different information about the real estate property, and wherein the position-indicative information in each limited range signal comprises data indicative of an elevation or floor for the limited range wireless transmitter that transmitted that limited range signal;
a mobile computing device, the mobile computing device configured to execute a mobile application, the mobile application configured to (1) determine data indicative of a position for the mobile computing device within the real estate property, (2) process a plurality of limited range signals wirelessly received by the mobile computing device from a plurality of the limited range wireless transmitters, (3) resolve which of the limited range signals were transmitted from a limited range wireless transmitter having a correspondence in elevation or floor with the determined position for the mobile computing device based on the elevation-indicative or floor-indicative data within a plurality of the processed limited range signals, (4) select a limited range signal from among the plurality of received limited range signals based at least in part on (i) relative signal strengths between the received limited range signals, and (ii) the resolved correspondence in elevation or floor such that the selected limited range signal was transmitted from one of the limited range transmitters sharing the correspondence in elevation or floor with the mobile computing device's determined position, (5) select and extract floor-specific information about the real estate property from the selected limited range signal such that the selected and extracted floor-specific information is specific to the floor that relates to the determined position for the mobile computing device, and (6) based on the extracted floor-specific information about the real estate property, generate data for a visual display about the real estate property corresponding to the selected limited range signal for consumption by a user of the mobile computing device through a display screen of the mobile computing device.

2. The system of claim 1 wherein the limited range wireless transmitters are programmable in response to administrator input to define the elevation-indicative or floor-indicative data for inclusion in the limited range signals.

3. The system of claim 1 wherein the limited range wireless transmitters comprise a plurality of Bluetooth transmitters.

4. The system of claim 1 wherein the limited range wireless transmitters comprise a plurality of WiFi transmitters.

5. The system of claim 1 wherein the limited range wireless transmitters comprise a plurality of infrared transmitters.

6. The system of claim 1 wherein the position-indicative information in each limited range signal comprises data indicative of a floor for the limited range wireless transmitter that transmitted that limited range signal, and wherein the mobile application is further configured to resolve which of the limited range signals were transmitted from a limited range wireless transmitter having a correspondence in floor with the determined position for the mobile computing device based on the floor-indicative data within a plurality of the processed limited range signals.

7. The system of claim 1 wherein the position-indicative information in each limited range signal comprises data indicative of an elevation for the limited range wireless transmitter that transmitted that limited range signal, and wherein the mobile application is further configured to resolve which of the limited range signals were transmitted from a limited range wireless transmitter having a correspondence in elevation with the determined position for the mobile computing device based on the elevation-indicative data within a plurality of the processed limited range signals.

8. The system of claim 1 wherein at least one of the limited range wireless transmitters is positioned at a transition point within the real estate property between floors or elevations, and wherein the mobile application is further configured to determine data indicative of the position for the mobile computing device within the real estate property by detecting when the mobile computing device comes within close proximity to the limited range wireless transmitter at the transition point based on a signal strength detected by the mobile computing device for the limited range signal produced by the limited range wireless transmitter at the transition point.

9. The system of claim 8 wherein the transition point comprises a member of the group consisting of a stairway and an elevator, and wherein the at least one limited range wireless transmitter positioned at the transition point comprises a first limited range wireless transmitter positioned at an ingress to the member and a second limited range wireless transmitter positioned at an egress from the member.

10. A computer program product comprising:
a plurality of instructions resident on a non-transitory computer-readable storage medium for execution as a mobile application by a mobile computing device, wherein the instructions are configured, upon execution by the mobile computing device, to cause a processor of the mobile computing device to:
interact with a wireless receiver of the mobile computing device to process a plurality of limited range signals wirelessly received from a plurality of limited range wireless transmitters located at a plurality of positions within a real estate property, wherein the positions include a plurality of floors of the real estate property, each limited range signal including (1) information about the real estate property, wherein the real estate property information includes floor-specific real estate property information, and (2) data indicative of an elevation or floor for the limited range wireless transmitter that transmitted that limited range signal;
determine data indicative of a current position for the mobile computing device relative to a plurality of the limited range wireless transmitters based at least in part on relative signal strengths as between the received limited range signals;
determine data indicative of a current position for the mobile computing device relative to a floor of the real estate property based at least in part on the elevation-indicative or floor-indicative data within the processed limited range signals;

select and extract floor-specific information about the real estate property from a processed limited range signal based at least in part on the determined current relative positions such that the selected and extracted floor-specific information is specific to the floor that relates to the determined current position for the mobile computing device; and generate data for a visual display about the real estate property based on the selected and extracted floor-specific information for consumption by a user of the mobile computing device through a display screen of the mobile computing device.

11. The computer program product of claim 10 wherein the limited range signals comprise Bluetooth signals, and wherein the instructions are configured, upon execution by the mobile computing device, to cause a processor of the mobile computing device to interact with a Bluetooth receiver of the mobile computing device to process the Bluetooth signals.

12. The computer program product of claim 10 wherein the limited range signals comprise WiFi signals, and wherein the instructions are configured, upon execution by the mobile computing device, to cause a processor of the mobile computing device to interact with a WiFi receiver of the mobile computing device to process the WiFi signals.

13. The computer program product of claim 10 wherein the limited range signals comprise infrared signals, and wherein the instructions are configured, upon execution by the mobile computing device, to cause a processor of the mobile computing device to interact with an infrared receiver of the mobile computing device to process the infrared signals.

14. The computer program product of claim 10 wherein the information in each limited range signal comprises data indicative of a floor for the limited range wireless transmitter that transmitted that limited range signal, and wherein the instructions are further configured, upon execution by the mobile computing device, to cause a processor of the mobile computing device to determine the data indicative of a current position for the mobile computing device relative to a floor of the real estate property based at least in part on the floor-indicative data within the processed limited range signals.

15. The computer program product of claim 10 wherein the information in each limited range signal comprises data indicative of an elevation for the limited range wireless transmitter that transmitted that limited range signal, and wherein the instructions are further configured, upon execution by the mobile computing device, to cause a processor of the mobile computing device to determine the data indicative of a current position for the mobile computing device relative to a floor of the real estate property based at least in part on the elevation-indicative data within the processed limited range signals.

16. The computer program product of claim 15 wherein the instructions are further configured, upon execution by the mobile computing device, to cause a processor of the mobile computing device to:
interact with an altimeter of the mobile computing device;
determine a current elevation for the mobile computing device based on the altimeter interaction; and
determine the data indicative of a current position for the mobile computing device relative to a floor of the real estate property based at least in part on a correspondence in elevation between the determined current elevation for the mobile computing device and the elevation-indicative data within the processed limited range signals.

17. A method comprising:
positioning a plurality limited range wireless transmitters at a plurality of positions within a real estate property such that the limited range wireless transmitters are positioned on a plurality of floors of the real estate property;
programming each of a plurality of the limited range wireless transmitters to transmit a limited range signal such that each limited range signal includes (1) information about the real estate property, wherein the real estate property information includes floor-specific real estate property information, and (2) data indicative of an elevation or floor for the limited range wireless transmitter that transmitted that limited range signal; and
wirelessly transmitting the limited range wireless signals from the positioned limited range wireless transmitters for reception by a mobile computing device that executes a mobile application, the mobile application configured to:
interact with a wireless receiver of the mobile computing device to process a plurality of the wirelessly transmitted limited range signals that are received by the wireless receiver;
determine data indicative of a current position for the mobile computing device relative to a plurality of the limited range wireless transmitters based at least in part on relative signal strengths as between the received limited range signals;
determine data indicative of a current position for the mobile computing device relative to a floor of the real estate property based at least in part on the elevation-indicative or floor-indicative data within the processed limited range signals;
select and extract floor-specific information about the real estate property from a processed limited range signal based at least in part on the determined current relative positions such that the selected and extracted floor-specific information is specific to the floor that relates to the determined current position for the mobile computing device; and
generate data for a visual display about the real estate property based on the selected and extracted floor-specific information for consumption by a user of the mobile computing device through a display screen of the mobile computing device.

18. The method of claim 17 wherein the limited range wireless transmitters comprise at least one member of the group consisting of (1) a plurality of Bluetooth transmitters, (2) a plurality of WiFi transmitters, and (3) a plurality of infrared transmitters.

19. The method of claim 16 wherein the positioning step comprises positioning at least one of the limited range wireless transmitters at a transition point within the real estate property between floors or elevations for use by the mobile computing device to determine when the mobile computing device moves to a new floor or elevation based on detecting when the mobile computing device comes within close proximity to the limited range wireless transmitter at the transition point based on a signal strength detected by the mobile computing device for the limited range signal produced by the limited range wireless transmitter at the transition point.

20. The method of claim 19 wherein the transition point comprises a member of the group consisting of a stairway and an elevator, and wherein the positioning step comprises (1) positioning a first limited range wireless transmitter at an ingress to the member and (2) positioning a second limited range wireless transmitter at an egress from the member.

* * * * *